United States Patent [19]
Schirmag

[11] 3,891,081
[45] June 24, 1975

[54] REVERSIBLY MOVING ELONGATED STOCK IN TRANSVERSE DIRECTION

[75] Inventor: Klaus-Peter Schirmag, Lintorf, Germany

[73] Assignee: Mannesmannrohren-Werke AG, Dusseldorf, Germany

[22] Filed: Aug. 12, 1974

[21] Appl. No.: 496,574

[30] Foreign Application Priority Data
Aug. 28, 1973 Germany............................ 2343769

[52] U.S. Cl.................... 198/218; 198/107; 214/1 P
[51] Int. Cl.²........................................ B65G 25/04
[58] Field of Search......... 214/1 R, 1 BB, 1 P, 1 PB, 214/23; 198/106, 107, 218

[56] References Cited
UNITED STATES PATENTS

| | | | |
|---|---|---|---|
| 701,024 | 5/1902 | Edwards | 198/218 X |
| 793,926 | 7/1905 | Edwards | 198/218 X |
| 2,525,305 | 10/1950 | Lombard | 214/1 P X |

*Primary Examiner*—Frank E. Werner
*Attorney, Agent, or Firm*—Ralf H. Siegemund

[57] ABSTRACT

Pipes or other elongated stock are moved transverse by two or more rolls with cams contoured so that back and forth turning of the rolls over one range moves the pipes on and along the rolls in one direction, and back and forth turning of the rolls in a different range moves the pipes in the opposite direction. The cams are arranged in staggered rows with steep stop surfaces facing the oncoming pipe in each instance, while each cam has a curved running surface on which a pipe will roll down after having been lifted upon turning of the rolls.

6 Claims, 6 Drawing Figures

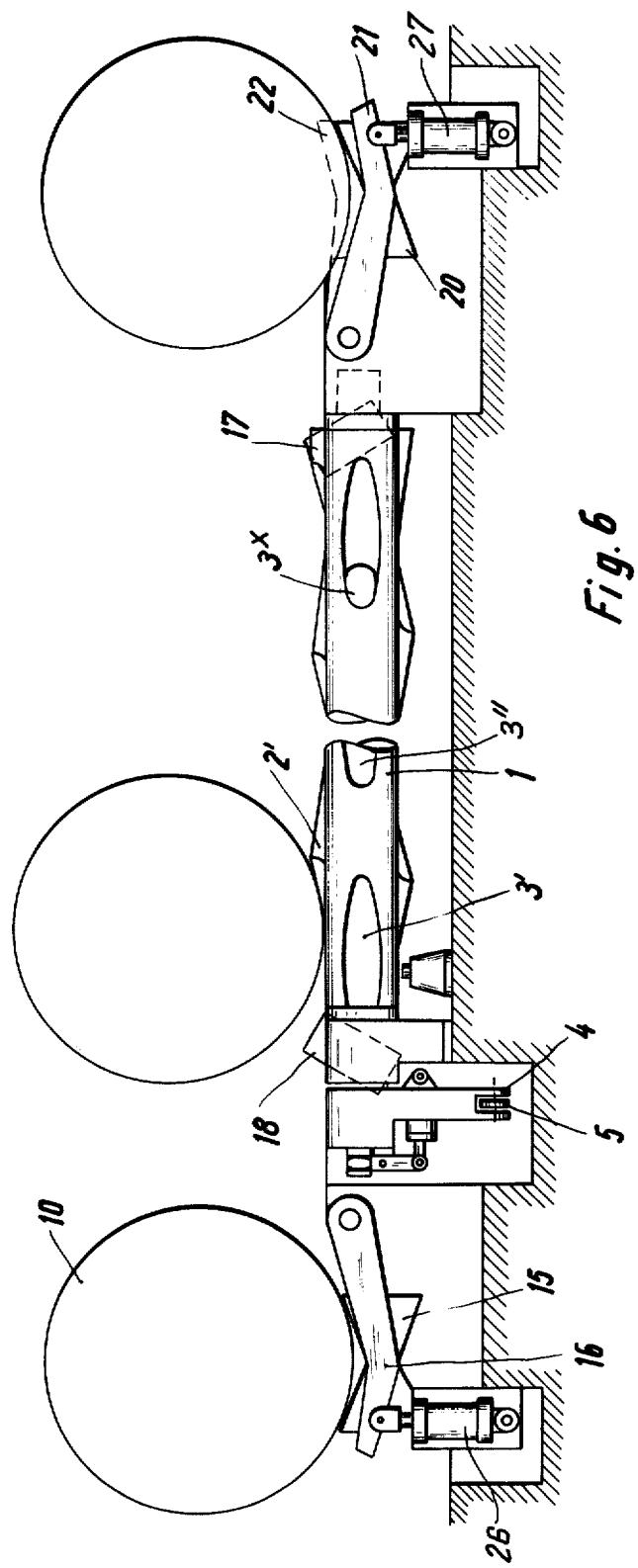

REVERSIBLY MOVING ELONGATED STOCK IN TRANSVERSE DIRECTION

BACKGROUND OF THE INVENTION

The present invention relates to the reversible, transverse transportion of elongated stock, such as rolled pipes or tubes or the like.

The transverse movement of rolled stock out of the path of rolling is a problem of long standing. Most of the devices used here to solve the problem are prone to damage the work-piece through abrasion. Additionally, it is a drawback that the equipment which engages the stock or is temporarily fastened thereto does not suffice; roller tracks or other carrying elements are needed also. A typical example of the known equipment is shown, for example, in German Pat. No. 1,128,384. Another problem is to be seen in the fact that the known equipment is usually uni-directional, that is to say, the stock can be moved transversely in one direction only. That may suffice in cases, but is quite a limitation in others.

DESCRIPTION OF THE INVENTION

It is an object of the present invention to provide a mechanically simple reversible, transverse or cross transport equipment of general utility, but of particular advantage for moving rolled stock, such as pipes of any diameter without the various drawbacks outlined above.

In accordance with the preferred embodiment of the invention, it is suggested to provide a plurality of elongated rolls, extending parallel to each other and in the direction of desired movement, i.e. transversely to the stock to be moved. Each of these rolls has two pairs of axially extending cams whereby each cam has an axially facing relatively steep stop surface, while defining a less steeply extending running surface in the opposite direction. The cams of the two rows pertaining to one pair are staggeredly arranged, and the steep stop surfaces all face in the same direction. The cams of the two rows of the other pair are likewise staggeredly arranged, but all their steep surfaces face in the opposite direction. Of course, the orientation of the running surfaces is the opposite in each instance. The rolls are turned back and forth over a limited range bounded by having the cams of one row and then of another row in upright position to cause a member, such as a pipe, to move in the direction in which the running surfaces of the cams face. The two other rows of cams are used analoguously for moving stock in the opposite direction, and the rolls are turned back and forth in a range azimuthally displaced as to each roll from the first mentioned range.

The transport equipment in accordance with the invention can be used for moving pipes of very small as well as for moving pipes of very large diameter. Moreover, no longitudinal component of movement is imparted upon the pipe, in contradistinction to worm gear-like conveyors. A pipe transported in that manner merely rolls in steps over running surfaces of cams from one stop position to another without incurring damage. The equipment can even be used to negotiate up and down inclines.

DESCRIPTION OF THE DRAWINGS

While the specification concludes with claims particularly pointing out and distinctly claiming the subject matter which is regarded as the invention, it is believed that the invention, the object and features of the invention and further objects, features and advantages thereof will be better understood from the following description taken in connection with the accompanying drawings, in which:

FIG. 6 is a side elevation of the equipment shown in FIG. 1 but illustrating some parts in greater detail.

Figure 1:
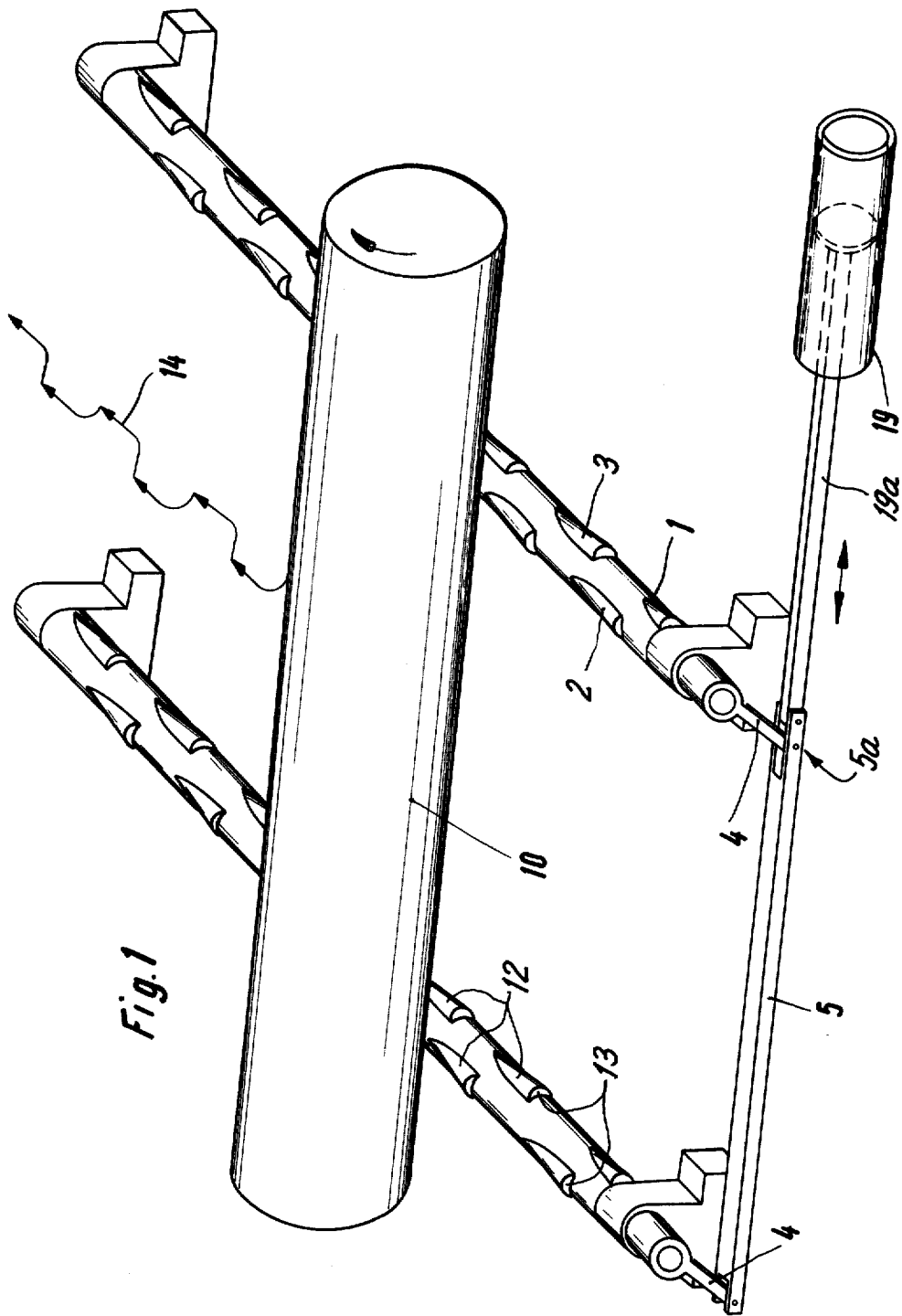
FIG. 1 is an isometric overview of a portion of transport equipment constructed in accordance with the preferred embodiment of the invention.

Proceeding now to the detailed description of the drawings, the Figures illustrate two carrier elements 1 having configuration of elongated rolls or rollers with two axial rows 2 and 3 of staggeredly arranged cams. More than two such rolls 1 can be provided, depending on the length of the elongated stock to be moved. However, one needs at least two such rolls 1 for purposes of balancing the stock when moved.

The cams each have a steep axial end on one side and contour 12 defining a curved surface gradually merging into the roller body in the opposite direction as well as in a more or less steep drop along a base line, along which each cam emerges from the roller body. These running surfaces 12 of the cams may be circularly or parabolically curved azimuthally, but should establish a straight running surface in axial direction. The cams may be made of metal or plastic or covered with a protective layer to prevent being abraded as well as to prevent abrasion of stock normally rolling over the respective cams, but such stock may occasionally also slide.

The rollers 1 are journalled in suitable bearings which are anchored to the floor of the machine hall. The bearing stands can be adjustable as to height which is well known per se and not illustrated here. Each roller has a pivot arm 4 extending radially therefrom and being lined to actuation rod and linkage means 5. The linkage 5 is connected to a piston rod 19a, which is hydraulically movable in a cylinder 19.

The double arrow illustrates the back and forth movement imparted by the hydraulic drive 19 upon the linkage 5, causing the rolls to turn over a limited range in alternating direction. As will be developed shortly, two operating ranges for turning the rolls are to be provided for. One range is directly discernible from FIG. 1. The arms 4 are shown in about a 7 to 8 o'clock angular position, wherein all cams of rows 2 have upright position. This defines one end or limit of the one range. Turning arms 4 to about the 6 o'clock position will place the cams of row 3 into the upright position and that is the other limit of that range. The angular range thus covers about 50°.

Generally speaking, the azimuthal displacement of the cam rows 2 and 3 should not be smaller than about 40° while more than 90° would be impractical as that would require the cams to project too much. Thus, the range should be not less than 40° and not more than 90°; about 50° to 60° is probably the best suitable range.

As can be seen best from FIG. 6, tubes or pipes 10 arrive on a roller track 15, moving the respective pipe in direction perpendicular to the plane of the drawing of FIG. 6. Reference numeral 16 refers to a pivotable lifter which lifts the tube or pipe off track 15 and onto the cross-transport arrangement having these cam rolls 1. Lifter 16 is a one arm lever actuated at the lever end by a hydraulic actuator 26. The arm 16 has a slightly bent portion defining a rather shallow cradle which is in line with the bottom line of an arriving pipe 10. Upon pivoting arm 16 up, it grips under the pipe, lifts it and permits rolling off in transverse direction onto rolls 1.

A back-stop 18 prevents return of a pipe 10, once deposited on rollers 1, onto the roller track 15. A similar positioning device 21 is provided at the other end of the transverse transport device. The device 21 has also a bent portion for receiving a pipe 10, holding it, and upon pivoting that pipe is laid onto a roller track 20. Reference numeral 17 denotes a back-stop which, however, is folded back and out of the way for transportation of pipes in direction to the right. The device 21 is also hydraulically pivoted through a piston/cylinder arrangement 27 operating in the vertical to take up the load of the pipe as it may rest on the arm 21.

FIG. 1 shows only the two rows 2 and 3 of cams in which steep cam sides or flanks, such as 13, face in one axial direction as to both rows. Each roll 1, however, has two more rows of cams, 7 and 8, which are of the same configuration as those of rows 2 and 3 (see FIG. 6), but their steep sides face in the opposite directions, also for both rows 7 and 8.

Figure 2:
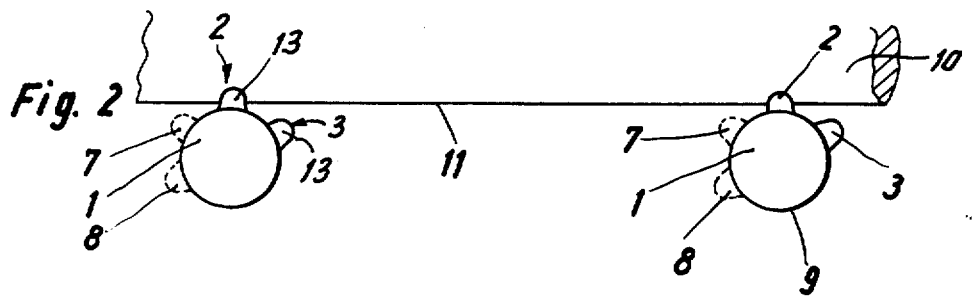
FIGS. 2 and 3 are schematic side elevations for demonstrating the synchronous oscillatory movement of the carrier elements of FIG. 1.

FIG. 2 shows two of the rollers 1 with one cam each of rows 2 and 3. Also, one cam each of rows 7 and 8 are shown, but they are outside of the operating range at the present. Arrow 6 in FIG. 3 denotes movement of the rolls 1 at that particular instant.

A portion, 9, of each roll 1 is not provided with any cams so that each roll has a smooth running surface 9 accordingly.

A word is needed here as to the operating ranges. The total angular range of possible displacement spans from row 3 to row 8, which is almost, but not quite 180°. Therefore, the illustration of FIG. 1 would have to be modified in that the arm 4 will turn in-between not quite the 9 o'clock position and a position somewhat between 6 and 7 o'clock, alternatingly placing cam rows 2 and 3 in upright position for the first operating range and direction of transverse transport. For a transport in the opposite direction, the arm 4 would swing between a little below the 3 o'clock position to a position between about 5 and 6 o'clock. This then is the range for alternatingly placing cam rows 7 and 8 in upright disposition.

The staggered arrangement of the cams of the rows 3 and 4 require some detailed consideration (the cams of rows 7 and 8 are analogously arranged, only the axial directions and orientations of the several operating surfaces are reversed).

As can be seen best from FIG. 6, but also in FIG. 1, the more gradually inclined running surfaces 12 of a cam of row 2 extend axially beyond the apex of a cam of row 3 and vice versa. Therefore, a pipe 10 that is being placed onto the running surfaces 12 of two cams, one each on the two rolls 1, will roll "down" on that running surface, and its bottom line (11) of engagement with rolls 1 will be (in the drawing) to the right of the apex of the next cam 13. If now rolls 1 are turned, the pipe 10 will be lifted onto the running surfaces 12 of these two cams of row 3 and will roll down again, thereby passing (axially) the apex of the next cam of the row 2. Now the rolls 1 are reversed and pipe 10 is lifted thereby onto the running surfaces of these two cams of rows 2 (one each per roll 1), rolls down again etc.

Figure 3:
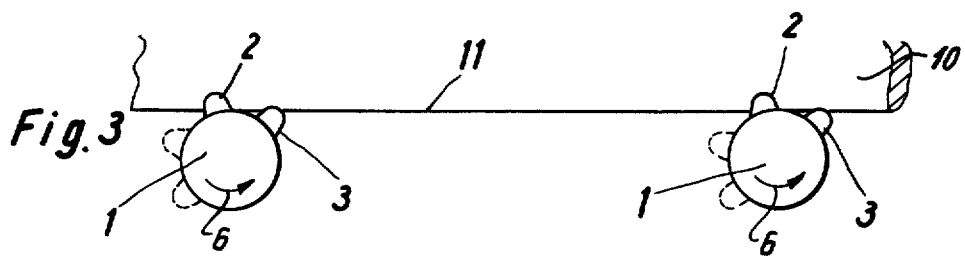
Figure 4:
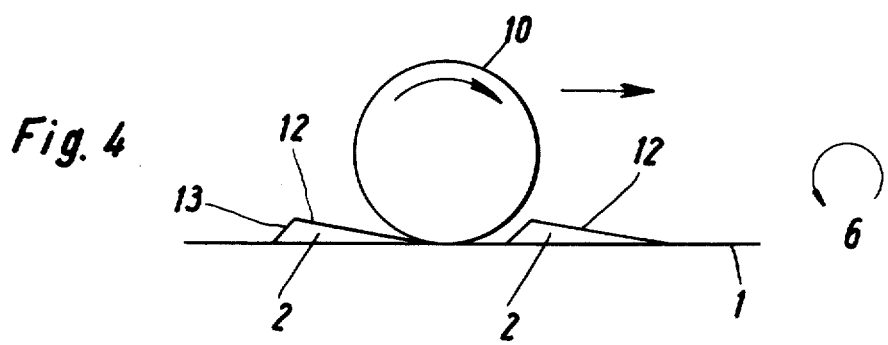
FIGS. 4 and 5 are schematic front elevations of a portion of the transport equipment with FIG. 4 showing an instant in-between the operational phases shown in FIGS. 2 and 3, and FIG. 5 showing an instance just prior to the phase of FIG. 2.

FIG. 2 shows the pipe 10 sitting on the (not visible) running surfaces of two cams, one each per row 2 of the two rows 1. When reaching the "bottom", that is the cylindrical periphery of each roll from which all of the cams project, the rolls are turned in direction of arrow 6 (FIG. 3). FIG. 4 shows the instant in which the pipe 10 has about reached that bottom! FIG. 3 shows the instant in which pipe 10 is just about going to be hoisted onto the running surfaces 12 of two cams respectively of the rows 3 on the two rolls 1. As can be seen specifically from FIG. 3, a pipe 10 that has rolled off the running surface of a cam of row 2, immediately engages a lateral flank portion of the curved running surface of a cam of row 3 (and vice versa). Thus, the rows are so spaced, and the cams are so contoured that there is no in-between free running surface for pipe 10 on rolls 1.

Figure 5:
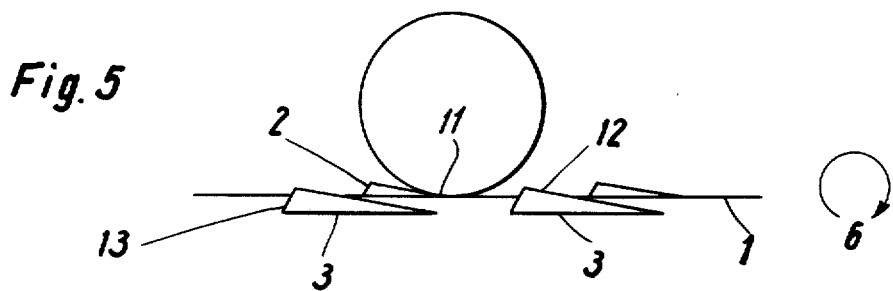

FIG. 5 shows the situation a little later, when the pipe has rolled off these cams of row 3 and the rolls 1 have been reversed, so that the pipe 10 is just about in the position to be hoisted onto cams of row 2, which in this Figure come into view and will be moved further, until having position as in FIG. 1 and shortly thereafter as in FIG. 4, whereupon the cycle is repeated but in the reverse.

Arrow-chain 14 in FIG. 1 shows the propagation path of a pipe 10 with slight longitudinal component in each step, but in opposite direction here in each two succeeding steps. This component of movement represents the engagement of rolls 1 with pipe 10 and the alternation of turning which is imparted as longitudinal displacment onto pipe 10. By placing the two rows 2 and 3 rather closely together azimuthally, that longitudinal component is minimized. Basically, one could say that the rolls 1 should not provide a free running surface for a pipe in-between the two operating cam rows!

Upon changing the pivot range of turning rolls 1, rows 7 and 8 can be brought into operation and a pipe will then be transported in the reverse direction. The distinction as to operation involves merely different ranges of piston displacement of actuator 19. Alternatively, one may change the length of connecting linkage 5 to piston rod 19a, e.g. at point 5a, so that actuator 19 is operated over its full range for each operation, but length adjustment of the linkage 5 as connected to the piston rod 19a of actuation 19 permits change in the selection of the pivot or turning range for rolls 1 and that in turn serves as the selection for the direction of transport of pipes 10. Of course, the length in the connection points of the two arms 4 to linkage 5 remains the same.

Turning now to the description of the overall operation, it can readily be seen that several pipes can be moved concurrently. Therefore, FIG. 6 can be interpreted as showing the same pipe 10 in different positions of progression or it can be interpreted as showing three different pipes in different stages of progression of transverse or cross movement and transport.

A pipe arrives at the transverse transport mechanism on roller track 15. During such arrival, actuator 26 holds the one swing arm of device 16 in down position.

At a suitable instant, actuator 26 pushes that arm up and the bent of device 16 grips under pipe 10, lifts it so that the pipe can roll off and along the long arm and towards the pivot.

A pipe 10 so lifted will run onto the smooth end surfaces of rolls 1, until abutting the first steep flank 13 of the first cam 2' of row 2. The pipe 10 will roll over back stop 18 which pivots out of the way but will prevent too far a reversal of pipe 10. Such a reversal may occur, if the pipe rolls against surface 13 rather forcefully and bounces back. The second pipe in FIG. 6 is shown in a stop position as against cam 2'.

Next, rolls 1 will be turned by the actuator 19 (FIG. 1) and the running surface 12 of the first cam 3' of row 3 is shifted under the pipe which will be lifted and will roll to the right, until abutting the steep end of cam 3''. Since both rolls 1 are turned in synchronism, this lift and roll off operation occurs on each of the rolls. Thereafter, rolls 1 pivot back and the pipe will be lifted onto the running surface of the first cam 2' of row 2 of each roll 1. Thus, the pipe will roll axially by another step.

It can readily be seen that by rocking the rolls 1 back and forth, the pipe is moved in steps to the right. The arrow line 14 in FIG. 1 denotes the travel path of the pipe. The 1st cam 3$^r$ of row 3 causes the pipe to roll off rolls 1, over the retracted back-stop 17 and onto lifted arm 21, but not further than the slightly upwardly bent portion of arm 21. The dotted line 22 in the FIG. 6 shows device 21 in the lifted position.

Finally, actuator 27 lowers arm 21 and thereby places the pipe 10 onto roller track 20. The third pipe in FIG. 6 has just been so placed. Roller track 20 will now move the pipe further.

It can readily be seen that the devices 16 and 21 are symmetrically constructed and arranged, and the actuators 26 and 27 are also similarly constructed. Thus, these devices can readily perform the respective reverse functions to move a pipe 10 from roller track 20 onto rolls 1, and from that transverse transport device onto roller track 15. Cam rows 7 and 8 are used in that case for stepwise moving a pipe from the right to the left as per illustration of FIG. 6. It is, however, necessary to fold back-stop 18 out of the way and to raise back-stop 17 for that operation.

It is important to realize that the transport mechanism is readily usuable to move pipes "uphill". The rolls 1 may be upwardly inclined in the direction of transport. It is merely required here that the inclination is not so steep that the running surfaces 12 assume a horizontal or even an upwardly inclined disposition. Rather, they must still be oriented so that a pipe will roll down on them.

In another advantageous manner, one can use the principle of the invention to provide for controlled downwards movement of the pipes. In this case, rolls 1 will be downwardly inclined but not so steep that steep flanks 13 of the cams can no longer serve as stops. A pipe 10 will roll in each step by a small step only, from engagement with the steep cam flank of one cam to engagement with the steep cam flank of a cam of the respective other row.

The invention is not limited to the embodiments described above, but all changes and modifications thereof not constituting departures from the spirit and scope of the invention are intended to be included.

I claim:

1. Device for moving elongated work-pieces, such as rolled stock (tubes, pipes or the like) in direction transverse to the direction of elongated extension, comprising:

a plurality of elongated rolls, arranged parallel to each other and extending in the direction of desired transverse direction;

a first pair and a second pair of rows of cams on each of the rolls, the cams of one of the rows of the first pair arranged staggeredly with regard to the cams of the other one of the rows of the one pair, each cam of the one and of the other row having a rather steep axially facing stop surface and a less inclined running surface in the opposite axial direction, the rows of cams of the second pairs having also staggeredly arranged cams with steep and less steep surfaces facing respectively in the opposite direction as the cams of the first pair;

and means for synchronously turning the rolls back and forth, whereby a first range covered has the rows of cams of the first pair alternatingly in upright position to move a work-piece axially in steps in the axial direction in which the less inclined cam surfaces of the first pair face, and whereby a second range covered by back and forth movement of the rolls has the rows of cams of the second pair alternatingly in upright position to move a work-piece axially in steps in the opposite direction.

2. Device as in claim 1, the cams of the rows of each pair being so contoured that upon rolling off one cam of one of the rows, and turning of the rolls, the work will immediately engage a cam of the other row of the pair.

3. Device as in claim 1, wherein the rolls are inclined to the horizontal.

4. Device as in claim 1, wherein the cams have rounded running surfaces.

5. Device as in claim 4, the rounding being parabolic.

6. Device as in claim 4, the rounding being circular.

* * * * *